US010574858B2

(12) United States Patent
Tezuka

(10) Patent No.: US 10,574,858 B2
(45) Date of Patent: Feb. 25, 2020

(54) IMAGE FORMING APPARATUS, METHOD OF CONTROLLING THE SAME, DITHER MATRIX, AND DITHER MATRIX GENERATION METHOD IN WHICH SCREEN PROCESSING IS EXECUTED ON A MULTI-TONE IMAGE

(71) Applicant: CANON KABUSHIKI KAISHA, Tokyo (JP)

(72) Inventor: Taiki Tezuka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/029,822

(22) Filed: Jul. 9, 2018

(65) Prior Publication Data
US 2019/0028612 A1   Jan. 24, 2019

(30) Foreign Application Priority Data

Jul. 20, 2017  (JP) ................................. 2017-141210

(51) Int. Cl.
| | | |
|---|---|---|
| *H04N 1/52* | (2006.01) | |
| *G06F 3/12* | (2006.01) | |
| *H04N 1/60* | (2006.01) | |
| *H04N 1/40* | (2006.01) | |
| *H04N 1/405* | (2006.01) | |

(52) U.S. Cl.
CPC ............ *H04N 1/52* (2013.01); *G06F 3/1208* (2013.01); *G06F 3/1248* (2013.01); *H04N 1/4058* (2013.01); *H04N 1/40087* (2013.01); *H04N 1/6019* (2013.01)

(58) Field of Classification Search
CPC . H04N 1/4058; H04N 1/40087; B41J 2/5056; B41J 2/52; G03G 15/04027; G06K 15/1881
See application file for complete search history.

(56) References Cited

U.S. PATENT DOCUMENTS

| | | | | |
|---|---|---|---|---|
| 5,831,626 A * | 11/1998 | Sano | .................... | H04N 1/4058 345/596 |
| 7,782,493 B2 * | 8/2010 | Asai | ..................... | H04N 1/4051 345/596 |
| 2002/0114012 A1 * | 8/2002 | Fujita | ........................ | B41J 2/52 358/3.06 |
| 2006/0238814 A1 * | 10/2006 | Murakami | ............. | H04N 1/405 358/3.14 |
| 2007/0115508 A1 * | 5/2007 | Kashibuchi | .......... | H04N 1/4056 358/3.13 |
| 2007/0127075 A1 * | 6/2007 | Inoue | ....................... | H04N 1/52 358/3.01 |

(Continued)

FOREIGN PATENT DOCUMENTS

| | | |
|---|---|---|
| JP | 2007-158548 A | 6/2007 |
| JP | 2017-046074 A | 3/2017 |

*Primary Examiner* — Ted W Barnes
(74) *Attorney, Agent, or Firm* — Venable LLP

(57) ABSTRACT

Threshold values in a dither matrix are arranged such that, in a case when screen processing is executed on a multi-tone image that has a first density, halftone dots are formed at a first screen angle, and, in a case when screen processing is executed on a multi-tone image that has a density being higher than a second density that is higher than the first density, halftone dots are formed at a second screen angle that is different from the first screen angle.

9 Claims, 17 Drawing Sheets

(56) References Cited

U.S. PATENT DOCUMENTS

| | | | | |
|---|---|---|---|---|
| 2009/0027704 A1* | 1/2009 | Kobayashi | ......... | H04N 1/00864 |
| | | | | 358/1.9 |
| 2009/0067006 A1* | 3/2009 | Kobayashi | ......... | H04N 1/00864 |
| | | | | 358/3.06 |
| 2010/0002265 A1* | 1/2010 | Yasutomi | ........... | H04N 1/40087 |
| | | | | 358/3.06 |
| 2010/0182621 A1* | 7/2010 | Yamada | ................ | H04N 1/4058 |
| | | | | 358/1.9 |
| 2012/0127488 A1* | 5/2012 | Nakatsuji | ........... | G03G 15/5025 |
| | | | | 358/1.1 |
| 2012/0188276 A1* | 7/2012 | Yamaguchi | .......... | H04N 1/4058 |
| | | | | 345/629 |
| 2015/0254537 A1* | 9/2015 | Abe | .................. | H04N 1/40068 |
| | | | | 358/1.2 |
| 2017/0061265 A1* | 3/2017 | Tezuka | ................ | G06K 15/407 |
| 2017/0150009 A1* | 5/2017 | Tamura | ................ | H04N 1/4058 |

\* cited by examiner

FIG. 7
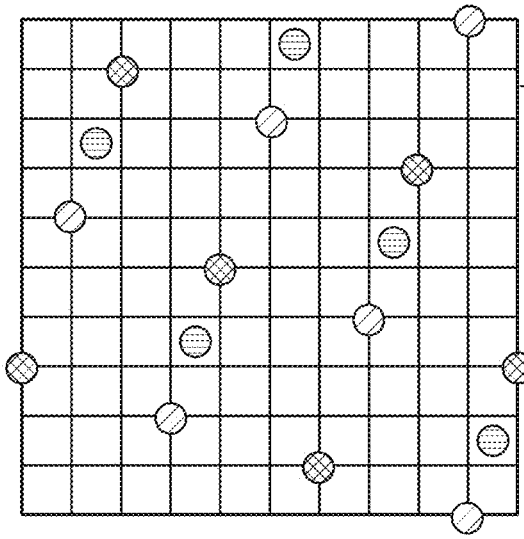
701
- FIRST GROWTH POINT
- SECOND GROWTH POINT
- THIRD GROWTH POINT
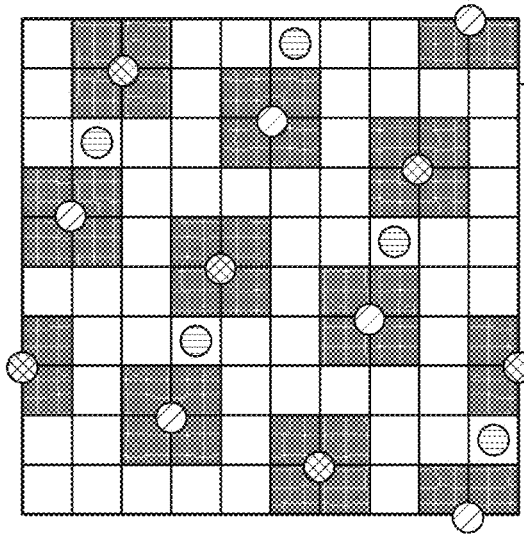
702
- FIRST GROWTH POINT
- SECOND GROWTH POINT
- THIRD GROWTH POINT
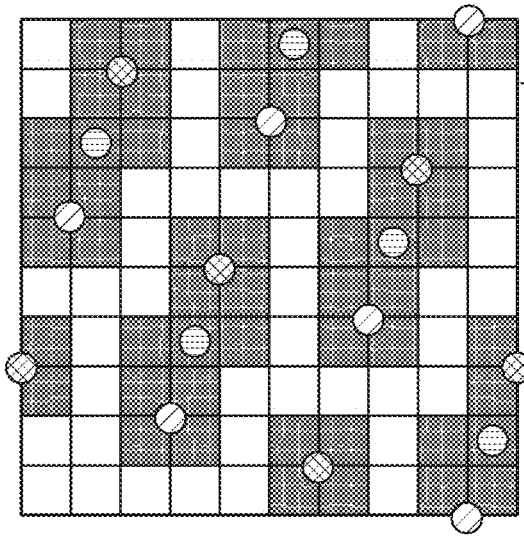
703
- FIRST GROWTH POINT
- SECOND GROWTH POINT
- THIRD GROWTH POINT

FIG 8

| 166 | 51  | 0   | 179 | 118 | 105 | 130 | 207 | 97  | 46  |
| --- | --- | --- | --- | --- | --- | --- | --- | --- | --- |
| 141 | 76  | 25  | 192 | 66  | 15  | 156 | 220 | 251 | 238 |
| 115 | 102 | 128 | 205 | 92  | 41  | 171 | 56  | 5   | 184 |
| 64  | 12  | 153 | 218 | 246 | 233 | 146 | 82  | 30  | 197 |
| 89  | 38  | 177 | 61  | 10  | 189 | 120 | 107 | 133 | 210 |
| 243 | 230 | 151 | 87  | 35  | 202 | 69  | 17  | 159 | 223 |
| 7   | 187 | 125 | 112 | 138 | 215 | 94  | 43  | 174 | 59  |
| 33  | 200 | 74  | 23  | 164 | 228 | 254 | 236 | 148 | 84  |
| 135 | 212 | 100 | 48  | 169 | 53  | 2   | 182 | 123 | 110 |
| 161 | 225 | 254 | 241 | 143 | 79  | 28  | 194 | 71  | 20  |

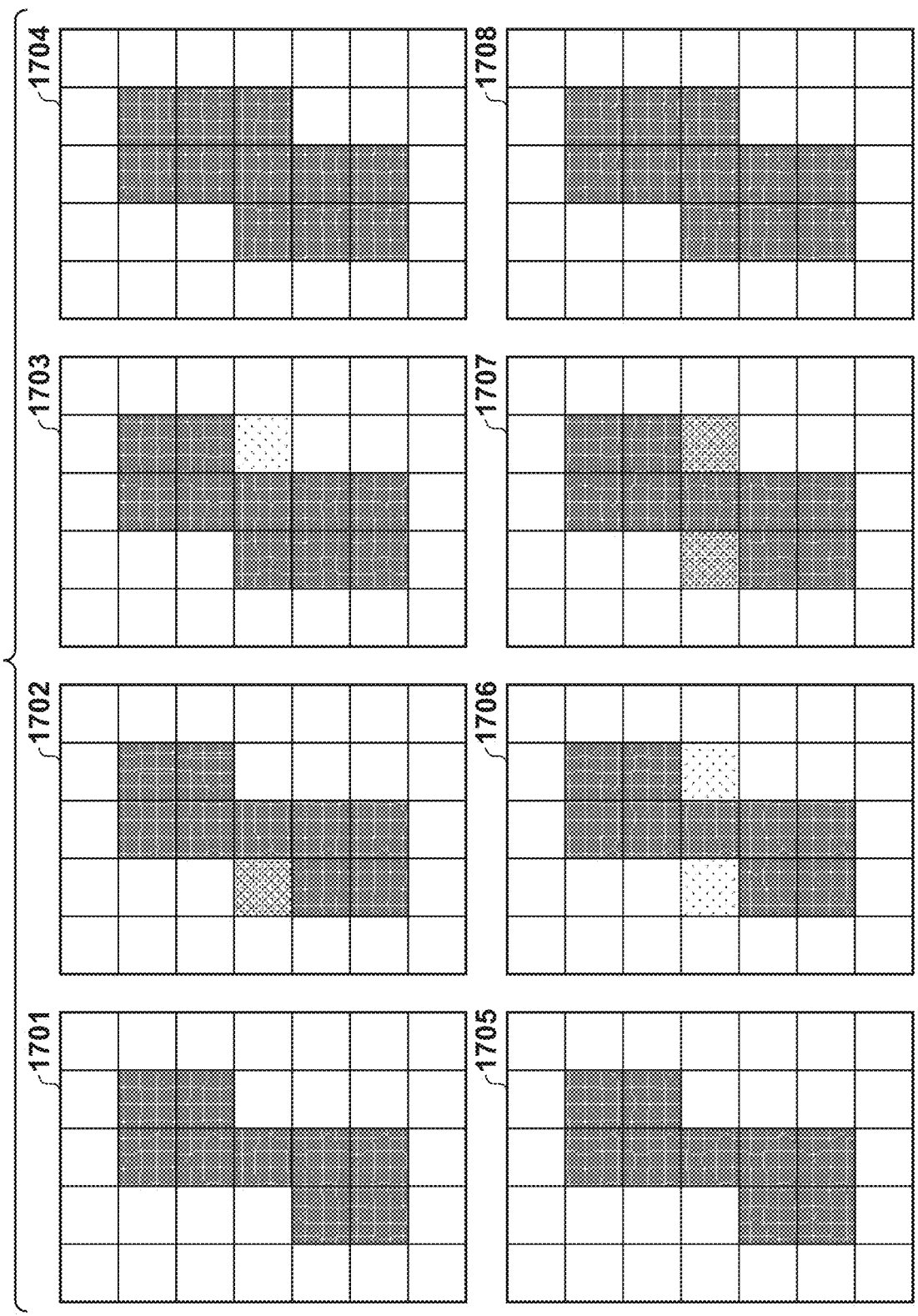

IMAGE FORMING APPARATUS, METHOD OF CONTROLLING THE SAME, DITHER MATRIX, AND DITHER MATRIX GENERATION METHOD IN WHICH SCREEN PROCESSING IS EXECUTED ON A MULTI-TONE IMAGE

This application claims the benefit of Japanese Patent Application No. 2017-141210 filed on Jul. 20, 2017, which is hereby incorporated by reference herein in its entirety.

BACKGROUND OF THE INVENTION

Field of the Invention

The present invention relates to an image forming apparatus, a method [for] of controlling the same, a dither matrix, and a dither matrix generation method.

Description of the Related Art

An electrophotographic method is known as an image recording method employed in an image forming apparatus such as a printer, a copier, or the like. An electrophotographic method is a method through which a latent image is formed on a photosensitive drum, using a laser beam, and the latent image is developed using charged coloring material (hereafter referred to as "toner"). Image recording is performed by transferring and fixing the developed toner image onto a transfer sheet. It is envisaged that image data output at this time is multi-tone image data that includes halftones. However, with the aforementioned electrophotographic method, it is difficult to obtain a halftone image. Therefore, screen processing is performed, through which pseudo-tones are expressed using a dot pattern that has a predetermined number of tones.

As screens used in screen processing, there are an FM screen, in which tones are expressed by increasing the number of dots according to an input image's density signal, and an AM screen, in which tones are expressed by increasing the size of dots that have been arranged according to each predetermined pattern. An AM screen using a high-frequency dot arrangement pattern is referred to as "a high screen-ruling screen", and that using a low-frequency dot arrangement pattern is referred to as "a low screen-ruling screen".

Conventionally, it is known that, when an image forming apparatus creates a mixed color image using screen processing, the occurrence cycles of dot patterns of individual colors interfere with each other, and an image defect called "moire" occurs. An example of a method of preventing such a phenomenon from occurring is to use a screen that has a high-frequency dot pattern in screen processing. Japanese Patent Laid-Open No. 2007-158548 proposes an image processing scheme for avoiding moire by performing image formation on colors that have low luminosity factors, using a high screen-ruling screen.

However, the above-described conventional technology has a problem as described below. For example, when image formation is performed using a high-frequency FM screen or a high screen-ruling screen, a change in tone (a change in tonality) is more rapid than when image formation is performed using a low screen-ruling screen. Therefore, density in a high-density range more quickly reaches a level near an upper limit value compared to when a low screen-ruling screen is used. Such a phenomenon is called "tonal loss". Conventionally, if tonal loss occurs, a method of using an LUT (Look Up Table) to adjust density is employed. This is a method of converting pixel values of an image that are to be subjected to screen processing, to other pixel values with reference to a conversion table, instead of using the original pixel values without change. However, dots generated using a high screen-ruling screen are smaller in size than those generated using a low screen-ruling screen, and result in an unstable latent image. Therefore, tonality per se changes over time, and there is a problem in which it is difficult to determine the reliability of density adjustment even if an LUT has been created once.

SUMMARY OF THE INVENTION

The present invention enables realization of a mechanism for reliably generating dots in a high-density range, and reliably avoiding tonal loss by realizing a gentle transition of tonality even when dots are generated using a high screen-ruling screen.

One aspect of the present invention provides an image forming apparatus comprising a storage device that stores dither matrices that are used in screen processing that is performed to convert a multi-tone image to a binary image or a multi-value image that has a smaller number of tones than the multi-tone image, and a controlling portion having hardware circuits, the controlling portion being configured to obtain a dither matrix corresponding to an input multi-tone image, from the storage device, and to execute screen processing using the obtained dither matrix, wherein threshold values in each of the dither matrices are arranged such that, in a case when screen processing is executed on a multi-tone image that has a first density, halftone dots are formed at a first screen angle and at a first screen ruling, and, in a case when screen processing is executed on a multi-tone image that has a density being higher than a second density that is higher than the first density, halftone dots are formed at a second screen angle that is different from the first screen angle and at a second screen ruling that is lower than the first screen ruling.

Another aspect of the present invention provides a method controlling an image forming apparatus that includes a storage device that stores dither matrices that are used in screen processing that is performed to convert a multi-tone image to a binary image or a multi-value image that has a smaller number of tones than the multi-tone image, the method comprising obtaining a dither matrix corresponding to an input multi-tone image, from the storage device, and executing screen processing, using the dither matrix thus obtained, wherein the threshold values in each of the dither matrices are arranged such that, in a case when screen processing is executed on a multi-tone image that has a first density, halftone dots are formed at a first screen angle and at a first screen ruling, and, in a case when screen processing is executed on a multi-tone image that has a density higher than a second density that is higher than the first density, halftone dots are formed at a second screen angle that is different from the first screen angle and at a second screen ruling that is lower than the first screen ruling.

Still another aspect of the present invention provides a dither matrix that is used in screen processing that is performed to convert a multi-tone image to a binary image or a multi-value image that has a smaller number of tones than the multi-tone image, the dither matrix comprising a first growth point that indicates a center point around which a dot in a screen is to grow a second growth point that is located in the vicinity of the first growth point, and a third growth point at which dots grown at the first and second growth points are combined and grow to be one dot, wherein the dither matrix is configured such that, in a case when screen processing is executed on a multi-tone image that has a first density, halftone dots are formed at a first screen angle and at a first screen ruling, and, in a case when screen processing is executed on a multi-tone image that has a density being higher than a second density that is higher than the first density, halftone dots are formed at a second screen angle that is different from the first screen angle and at a second screen ruling that is lower than the first screen ruling.

Yet still another aspect of the present invention provides a method of generating a dither matrix that is used in screen processing that is performed to convert a multi-tone image to a binary image or a multi-value image that has a smaller number of tones than the multi-tone image, the method comprising obtaining a dither matrix corresponding to an input multi-tone image, from the storage device, and executing screen processing, using the dither matrix thus obtained, wherein threshold values in the dither matrix are arranged such that, in a case where screen processing is executed on a multi-tone image that has a first density, halftone dots are formed at a first screen angle and at a first screen ruling, and, in a case when screen processing is executed on a multi-tone image that has a density higher than a second density that is higher than the first density, halftone dots are formed at a second screen angle that is different from the first screen angle and at a second screen ruling that is lower than the first screen ruling.

Further features of the present invention will be apparent from the following description of exemplary embodiments with reference to the attached drawings.

BRIEF DESCRIPTION OF THE DRAWINGS

FIG. 7 is a diagram showing growth points for dots in a screen according to one embodiment.

FIG. 8 is a diagram showing an arrangement of threshold values in a dither matrix according to one embodiment.

FIG. 17 is a diagram showing transitions of a screen image according to one embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Image Forming Apparatus

Figure 1:
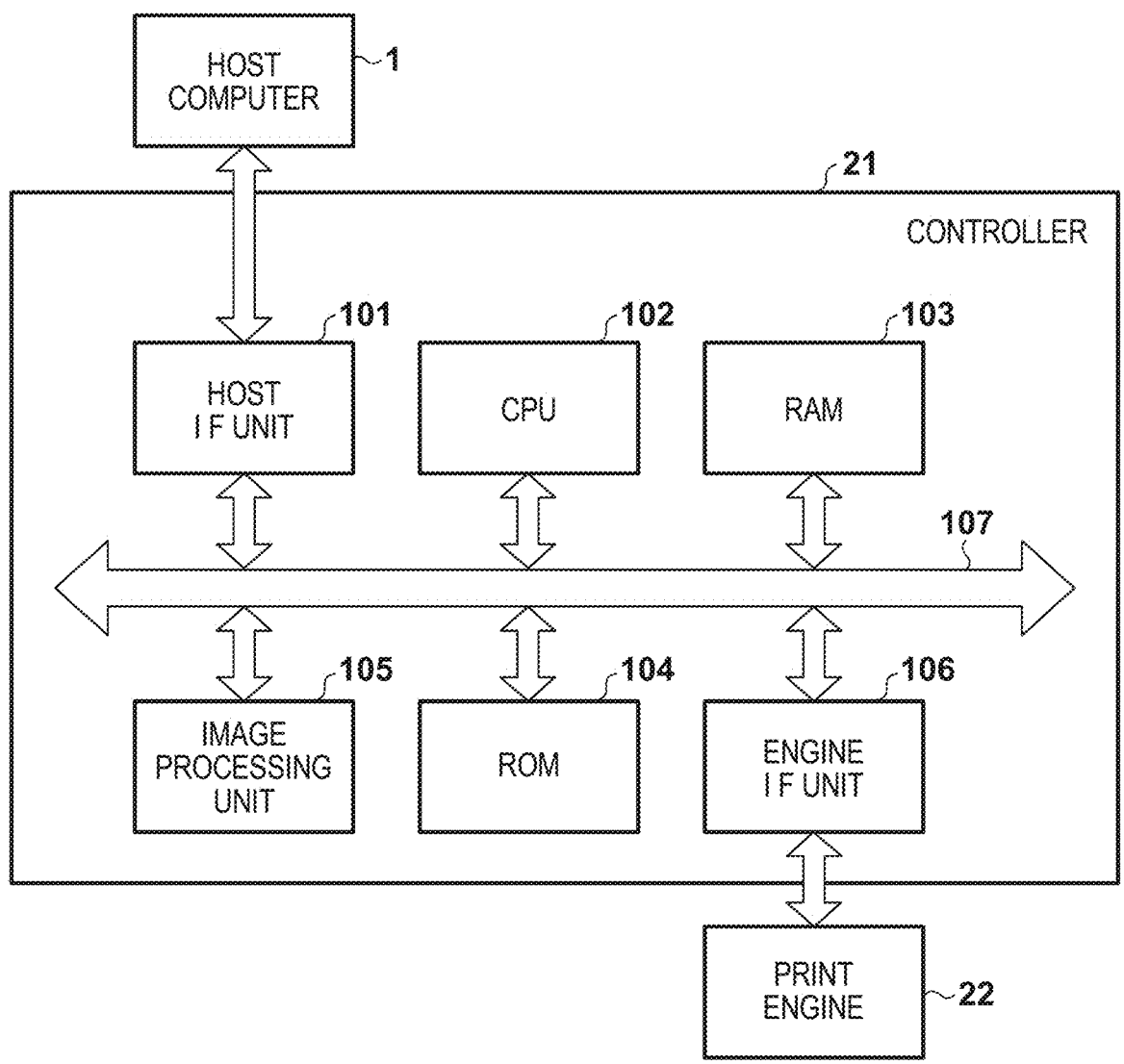
FIG. 1 is a block diagram showing a functional configuration of a controller 21 according to one embodiment.

The following describes a first embodiment of the present invention. In the present embodiment, an electrophotographic color image forming apparatus (hereafter simply referred to as "the image forming apparatus") will be described as an example. FIG. 1 shows an example of a system configuration of the image forming apparatus according to the present embodiment.

A system according to the present embodiment includes a host computer 1, a controller 21, and a print engine 22. The host computer 1 is a computer such as a typical PC (personal computer) or a WS (workstation). An image or a document created by the host computer 1 is input to the controller 21 as PDL (Page Description Language) data. PDL is a programming language for specifying the arrangement of characters and figures on "a page" that is to be printed or displayed.

The controller 21 is connected to the host computer 1 and the print engine 22, receives image data regarding multi-tone image that is to be printed, from the host computer 1, coverts the image data to print data for printing that is performed by the print engine 22, and outputs the print data to the print engine 22. The print engine 22 executes print processing (image forming processing) based on print data output from the controller 21.

Next, the following describes details of the controller 21. The controller 21 includes a host I/F unit 101, a CPU 102, a RAM 103, a ROM 104, an image processing unit 105, and an engine I/F unit 106. The host I/F unit 101 functions as an interface for receiving image data transferred from the host computer 1. For example, the host I/F unit 101 is constituted by Ethernet (registered trademark), a serial interface, or a parallel interface. The CPU 102 controls the controller 21 overall, using programs and data stored in the RAM 103 and the ROM 104, and also executes processing that is performed by the controller 21, which will be described below.

The RAM 103 includes a work area that is used by the CPU 102 and the image processing unit 105 to execute various kinds of processing. The ROM 104 stores a control program that is used by the CPU 102 to control the controller 21 overall, and programs and data for causing the controller 21 to execute various kinds of processing described below, setting data for the controller 21, and so on.

The image processing unit 105 performs image processing on input image data to output an image from the print engine 22 according to settings received from the CPU 102. The engine I/F unit 106 transfers print data that has undergone image processing performed by the controller 21, to the print engine 22. Reference numeral 107 indicates an internal bus of the controller 21, which connects the above-described units to each other.

The controller 21 receives print data, performs rasterization based on the print data, and generates image data and attribute data for each pixel. Print data has a color space including a plurality of color components such as RGB or CMYK, and each pixel of image data has an 8-bit value (256 tones) for each color component. Also, attribute data retains values representing attributes of objects such as a character, a line, a figure, and an image, and is internally handled by the image processing unit 105 together with image data.

Figure 2:
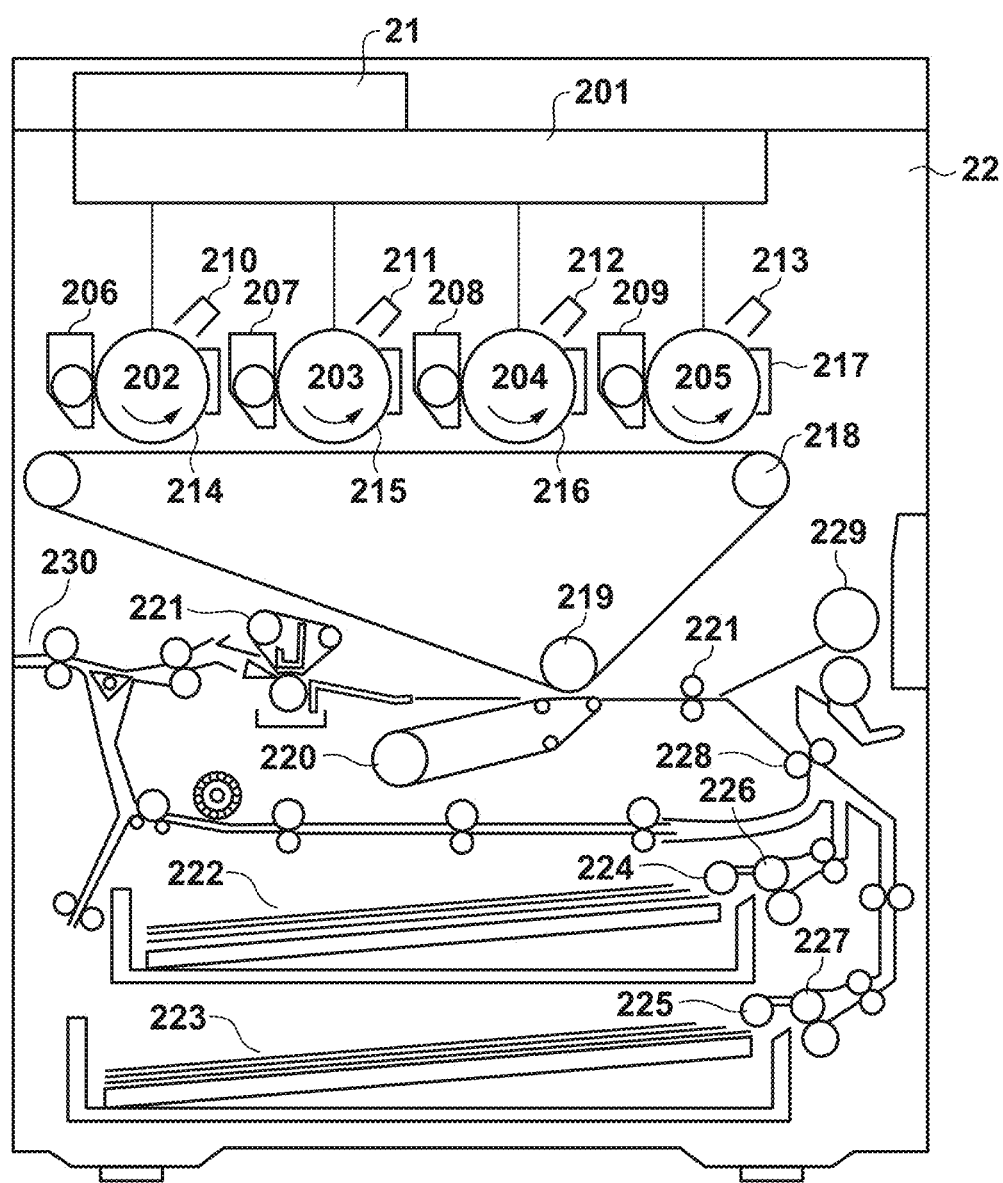
FIG. 2 is a cross-sectional view showing a schematic configuration of an image forming apparatus 2 according to one embodiment.

Next, the following describes an example in which the print engine 22 is formed as an electrophotographic engine. The print engine 22 has a configuration shown in FIG. 2. Photosensitive drums 202, 203, 204, and 205, which serve as image carriers, are respectively driven to rotate in directions indicated by the arrows. Primary chargers 210, 211, 212, and 213, an exposure control unit 201, and developing devices 206, 207, 208, and 209 are arranged in the rotational directions of the photosensitive drums 202 to 205, so as to face the outer circumferential surfaces of the photosensitive drums 202 to 205. The primary chargers 210 to 213 charge the surfaces of the photosensitive drums 202 to 205 to a uniform charge amount.

Subsequently, the exposure control unit 201 exposes the surfaces of the photosensitive drums 202 to 205 to light such as a laser beam that has been modulated based on recording image signals, and thus, latent images are formed thereon. Furthermore, the developing devices 206 to 209 that respectively store four colors, such as CMYK, of developer (toner) develop the aforementioned latent images. Cleaning devices 214, 215, 216, and 217, which are located downstream of image transfer areas where the visible images thus developed are transferred to an intermediate transfer member 219, clean the drum surfaces by scraping off toner remaining on the photosensitive drums 202 to 205 without being transferred to a recording sheet. Through the above-described process, image formation is sequentially performed using each color of toner.

Meanwhile, a recording sheet, which has been picked up by a pickup roller 224 or 225 from an upper cassette 222 or a lower cassette 223 and has been transported by a sheet feed roller 226 or 227, is transported by a transport roller 228 to a registration roller 231. Then, the recording sheet is transported to a position between the intermediate transfer member 219 and a transfer belt 220 at the time transfer to the intermediate transfer member 219 is complete. Thereafter, the recording sheet is transported by the transfer belt 220 while being pressed against the intermediate transfer member 219, and thus, a toner image on the intermediate transfer member 219 is transferred to the recording sheet. The toner image transferred to the recording sheet is fixed onto the recording sheet by heated and pressurized by a fixing roller and a pressure roller 221. The recording sheet on which the image is fixed is discharged to a face-up discharge port 230.

Figure 3:
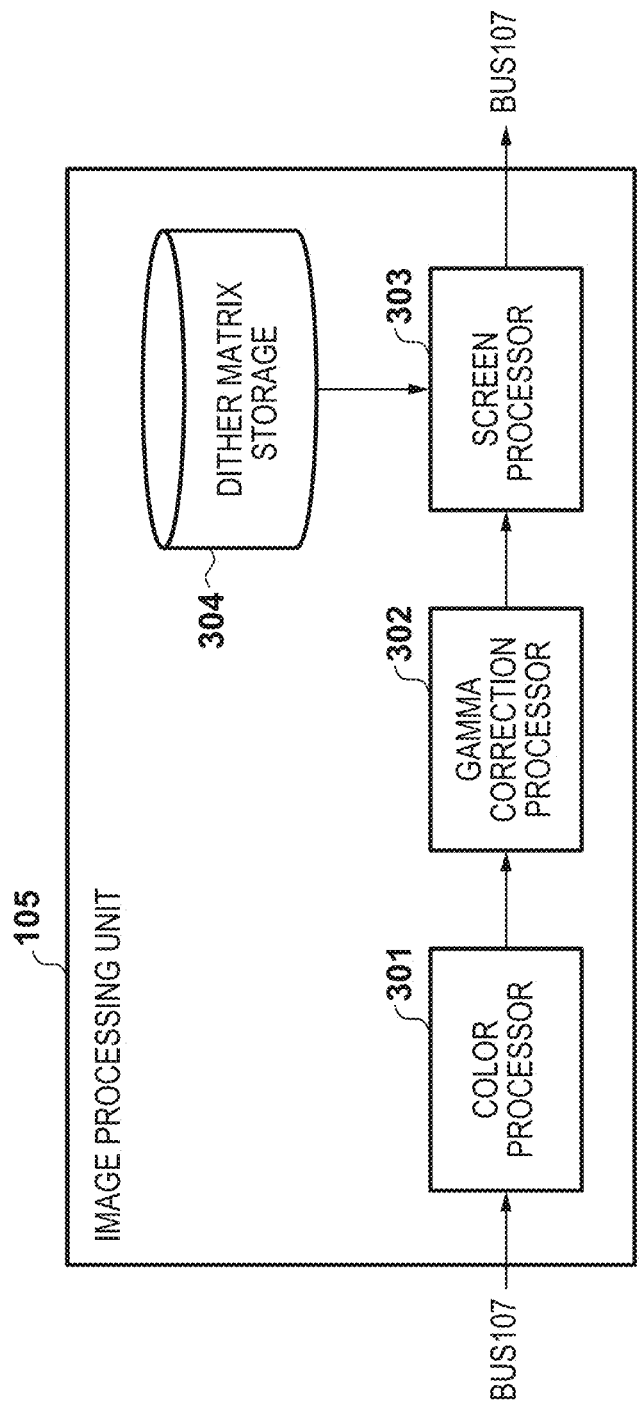
FIG. 3 is a block diagram showing an image processing unit 105 according to one embodiment.

Next, the following describes the configuration of the image processing unit 105. As shown in FIG. 3, the image processing unit 105 includes a color processor 301, a gamma correction processor 302, a screen processor 303, and a dither matrix storage 304. Note that it is envisaged that the image processing unit 105 according to the present embodiment is constituted by hardware circuits such as an ASIC. However, the image processing unit 105 is not limited to such a configuration. For example, the same image processing may be realized by causing hardware circuits such as a general purpose processor and a GPU to execute programs. Alternatively, image processing may be performed by an FPGA.

PDL data from the host computer 1 is input to the controller 21 via the host IF unit 101. The CPU 102 converts the input PDL data to raster data, performs control to store image data resulting from the conversion to the RAM 103. Note that the color components of image data to be stored in the RAM 103 are RGB components. The color processor 301 performs color conversion from RGB to CMYK, on the image data input to the RAM 103. The gamma correction processor 302 executes gamma correction processing, using a one-dimensional LUT, to correct input image data so that the density characteristics of the image will be desirable after being transferred to a recording sheet. In the present embodiment, a one-dimensional LUT that outputs an input without change is used as an example. However, the CPU 102 rewrites this one-dimensional LUT in response to a change in the state of the print engine 22 so that an output corresponding to the same input image data is the same before and after the state of the print engine 22 changes.

The screen processor 303 receives dither matrices from the dither matrix storage 304 and executes screen processing on input image data so that the print engine 22 can print an image on a recording sheet. As a result, the input image is converted to an image expressed by sparseness and denseness of dots of four colors, i.e., CMYK. The dither matrix storage 304 stores a dither matrix for each of the CMYK colors. An image generated by the screen processor 303 is transmitted to the engine I/F unit 106 via the bus 107.

Screen Processing

Figure 4:
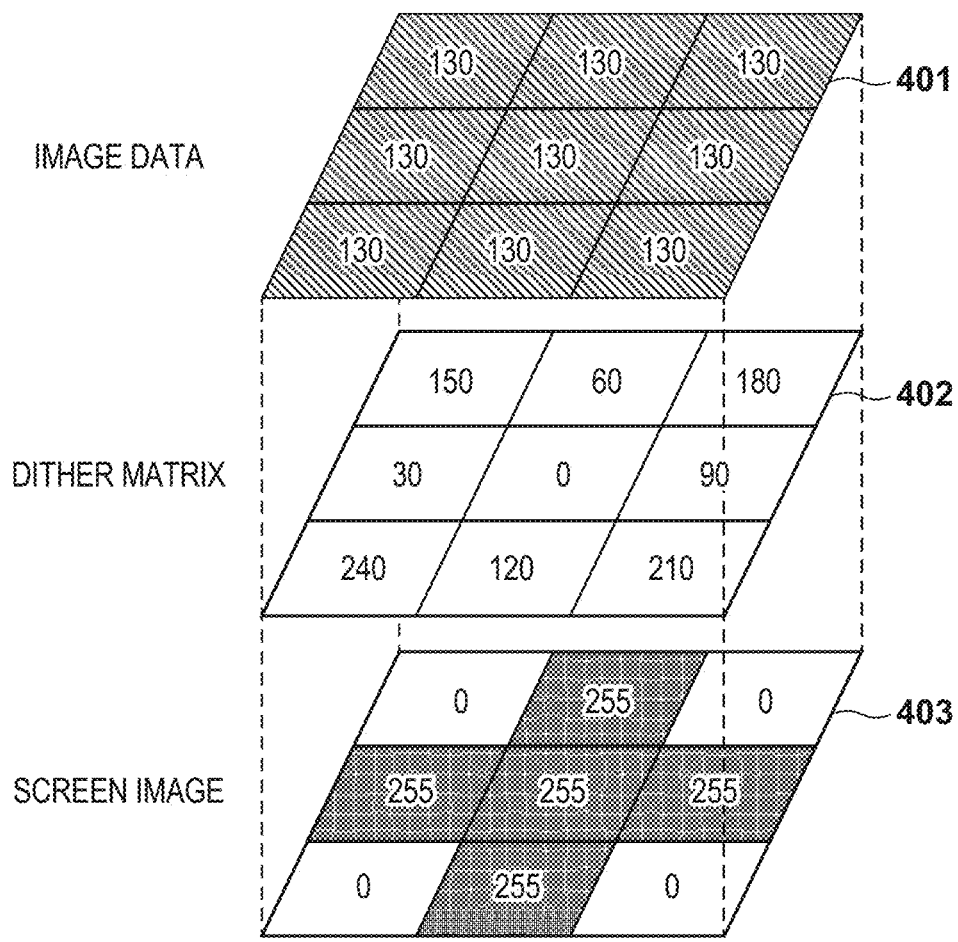
FIG. 4 is a diagram illustrating screen processing that is performed by a screen processor 303 according to one embodiment.

Next, the following describes screen processing that is performed by the screen processor 303 with reference to FIG. 4. Screen processing is processing through which image data that is expressed using continuous tones is expressed through area coverage modulation, i.e., a tone in each unit area is expressed as the ratio between a colored area and a non-colored area in the unit area. Dither matrices are used in screen processing. Dither matrices are threshold value tables that each shows growth in a screen.

Reference numeral 401 indicates image data, reference numeral 402 indicates a dither matrix used in screen processing, and reference numeral 403 indicates screen image data obtained through screen processing.

The screen processor 303, upon receiving the image data 401 input thereto, focuses on the respective pixel values of the pixels in the image data 401, and compares the pixel values with the threshold values in the dither matrix 402 stored in the dither matrix storage 304. As a result of the comparison, if the pixel value of a target pixel is greater than the threshold value in the dither matrix, the screen processing unit 303 performs control so that the pixel in the screen image data 403 corresponding to the target pixel has the maximum value of the tones. The present embodiment handles an image having 256 tones, and therefore, the maximum value is 255.

For example, screen processing is executed using nine (3×3) pixel image data in which each pixel has a pixel value "130", like the image data 401 shown in FIG. 4, and 1-bit 3×3 dither matrices, like the dither matrix 402 shown in FIG. 4. In this case, as a result of screen processing, if the threshold value of the dither matrix corresponding to an input pixel is smaller than the pixel value of the input pixel, the pixel value of the pixel corresponding thereto in the screen image data 403 will be the maximum value, which is 255. On the other hand, if the threshold value of the dither matrix is greater than the pixel value of the input pixel, the pixel value of the pixel corresponding thereto in the screen image data 403 will be 0. It is possible to change the image to be expressed as a screen image, by changing the arrangement of the threshold values in the dither matrix.

Arrangement of Threshold Values in Dither Matrices

Next, the following describes dither matrices held in the dither matrix storage 304 according to the present embodiment, and growth order of dots generated using the dither matrices with reference to FIGS. 5 to 9. In the present embodiment, the screen processor 303 generates a binarized image, using 1-bit dither matrices.

The dither matrix storage 304 stores dither matrices respectively corresponding to the CMYK colors, which are used by the screen processor 303. The following describes a dither matrix for image forming processing performed on the color K from among the four colors, i.e., CMYK.

Figure 5:
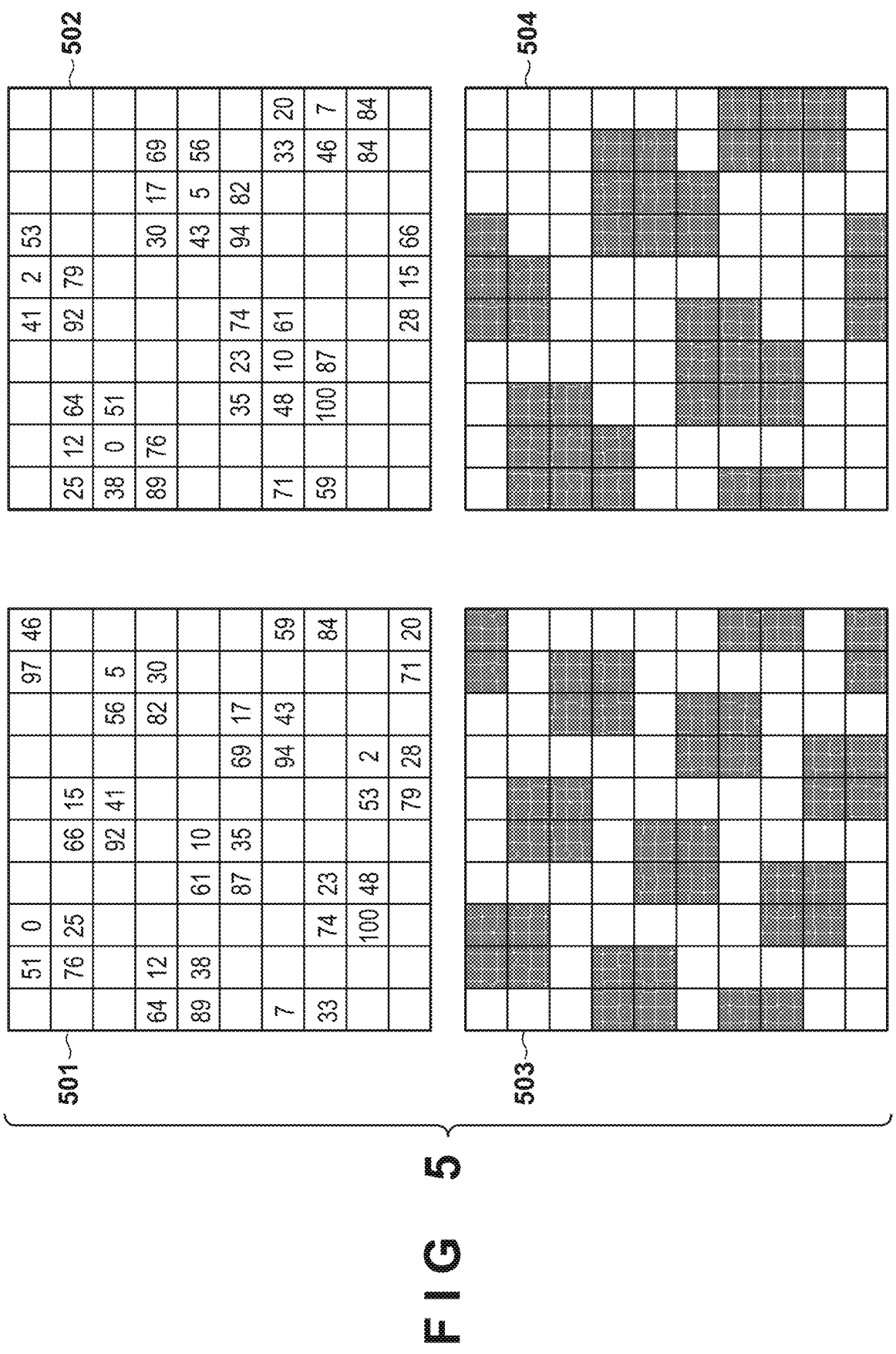
FIG. 5 is a diagram showing dither matrices that each represent a high screen-ruling screen and a low screen-ruling screen, and dots that are generated.

FIG. 5 shows an example in which the screen processor 303 performs image forming processing using dither matrices that each have different screen ruling. Reference numeral 501 indicates some of the threshold values arranged in a dither matrix that represents a high screen-ruling screen (with 190 lines). Reference numeral 502 indicates some of the threshold values arranged in a dither matrix that represents a low screen-ruling screen (with 134 lines). The two arrays of threshold values only show threshold values that are no greater than 102 (40% of 255). Reference numeral 503 indicates a screen image that is generated when an image that has a 10×10 size and in which the pixel values of all of the pixels are 102 is input to the screen processor 303 and the screen processor 303 performs image forming using the dither matrix indicated by the reference numeral 501. Reference numeral 504 indicates a screen image that is generated when image forming is performed on the same image as in the case of the screen image 503, using the dither matrix indicated by the reference numeral 502.

A comparison between the screen image 503 and the screen image 504 shows that the number of dots in the same area is greater in the case of high screen ruling as shown in the screen image 503. That is, it is shown that the dot occurrence pattern in the screen image 503 is a high-frequency pattern. It is commonly known that, when a CMYK mixed color image is generated, the respective dot occurrence patterns of the CMYK colors interfere with each other, and an image defect called "moire" occurs. A method that is employed to reduce such moire is to increase the dot pattern frequency for each of the CMYK colors, thereby also increasing the frequency at which interference occurs, and thus, make interference inconspicuous. Therefore, it is desirable that a high screen-ruling screen is used in the present embodiment as well. However, if a high screen-ruling screen is used, tonal loss is likely to occur in a high-density range, and dots are unstable. Therefore, it is difficult to adjust the density, which is an issue.

Figure 6:
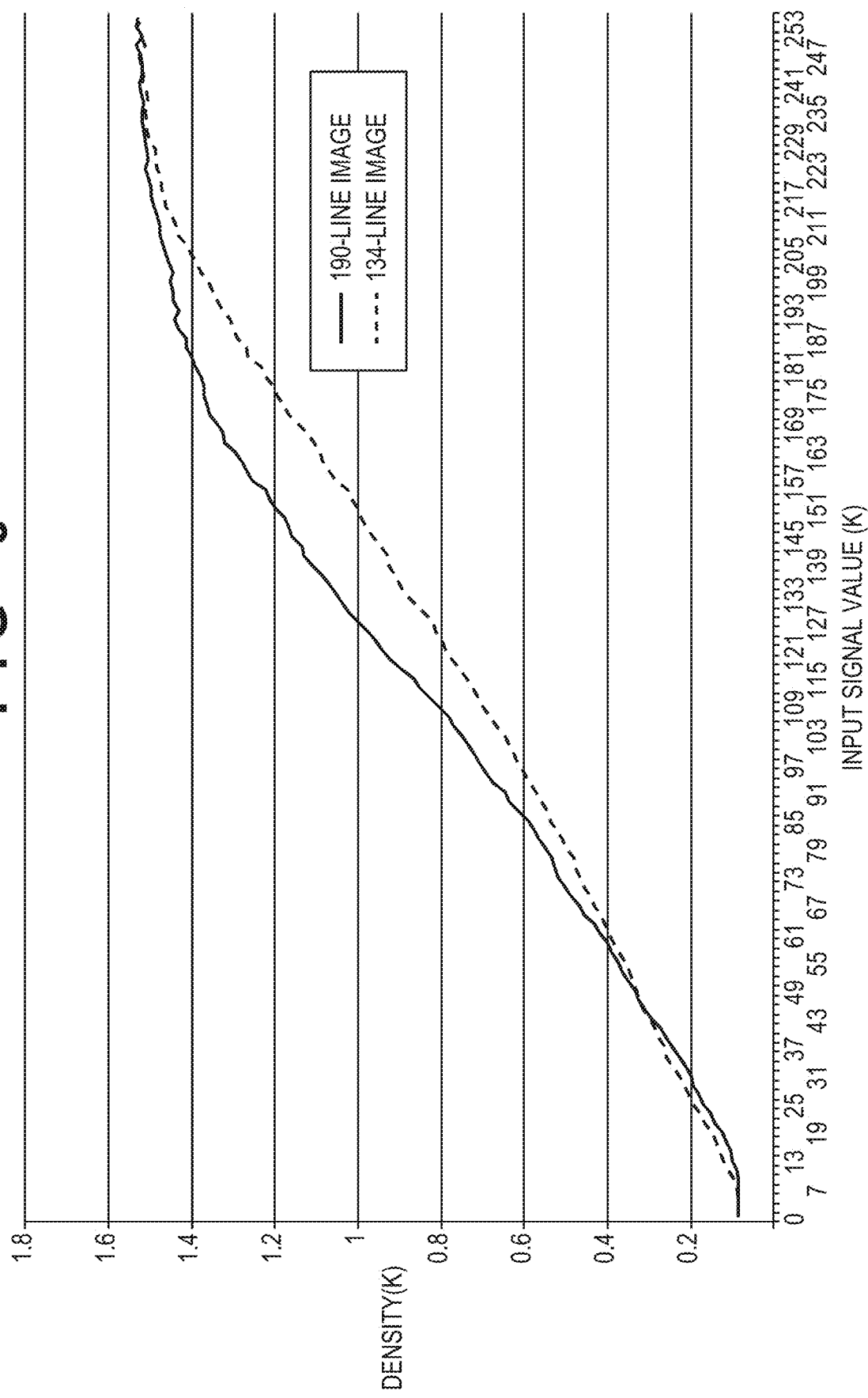
FIG. 6 is a diagram comparing the density tonality of a high screen-ruling screen with the density tonality of a low screen-ruling screen.

FIG. 6 shows a graph comparing the density tonality obtained using a high screen-ruling screen with the density tonality obtained using a low screen-ruling screen. The horizontal axis indicates an input signal value (K) and the vertical axis indicates a density value (K). As can be seen from the result of a comparison shown in FIG. 6, the change in tone shown in the density tonality of an image formed and printed using a high screen-ruling screen is steeper than the change in tone shown in the density tonality of an image formed and printed using a low screen-ruling screen. It can also be seen that tonal loss has occurred in a high-density range. A commonly-known method for performing density adjustment in such a case is to use an LUT in the gamma correction processor 302. However, as shown in the screen image 503 and the screen image 504, dots generated using a high screen-ruling screen each have a size corresponding to four pixels, whereas dots generated using a low screen-ruling screen each have a size corresponding to eight pixels. It is generally said that the larger the size of each dot is, the more stable are the latent images formed on the photosensitive drums 202 to 205. Therefore, the shape of each dot formed on a sheet based on a screen image generated using a high screen-ruling screen is unstable. Due to such instability, it is difficult to perform density adjustment using an LUT.

Therefore, a dither matrix employed in the present embodiment to form a mixed-color screen image is to form a high screen-ruling screen (190 lines) from a highlight range to an intermediate-density range, and the high screen-ruling screen changes to a low screen-ruling screen (134 lines) from an intermediate-density range to a high-density range. Preferably, such a dither matrix is stored in the dither matrix storage 304 in advance. The screen processor 303 obtains a dither matrix from the dither matrix storage 304, and performs image formation using the dither matrix.

Figure 9:
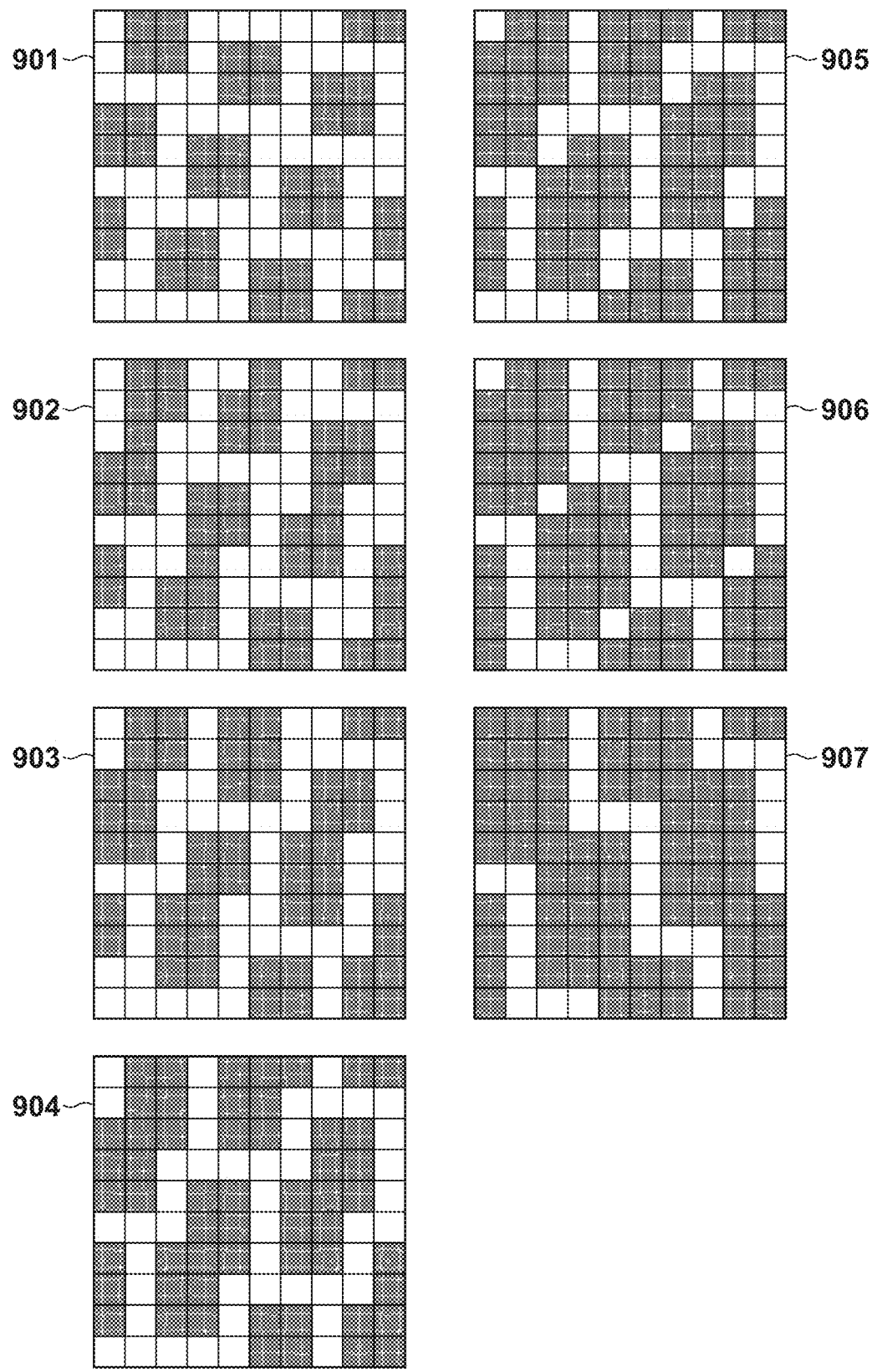
FIG. 9 is a diagram showing transitions of a screen image according to one embodiment.

FIG. 7 shows a transition from a high screen ruling to a low screen ruling in a screen image generated using a dither matrix employed in the present embodiment, and FIG. 8 shows the arrangement of threshold values in a dither matrix that is actually held in the dither matrix storage 304. Also, FIG. 9 shows a part of a transition of a screen image according to the present embodiment.

FIG. 7 shows an image indicating dot growth center points (growth points) in a screen generated using a dither matrix in the present embodiment. As shown in the screen indicated by the reference numeral 701, the screen according to the present embodiment has three types of growth points. First growth points are growth points that are included in growth points that express growth for a 190-line screen. When focusing on one first growth point, no other first growth points are included in growth points that are nearest to the focused growth point from among growth points that are located around the focused growth point. Similarly, second growth points are growth points that are included in growth points that express growth for the 190-line screen. When focusing on one first growth point, at least one of the growth points that are nearest to the focused growth point from among growth points that are located around the growth point is a second growth point. These two types of growth points, namely, the first growth points and the second growth points, are growth points for forming a high screen-ruling screen.

The screen indicated by the reference numeral 702 shows how dots grow at the first growth points and the second growth points. It can be seen that a high screen-ruling screen like the screen image 503 is formed. Third growth points are each located at the midpoint between a first growth point and a second growth point (the middle position). At a third growth point, two dots, namely, a dot generated at a first growth point and a dot generated at a second growth point, are combined, and thus, the two dots grow to be one dot of a low screen-ruling screen. The screen indicated by the reference numeral 703 shows how dots grow at the third growth points. It can be seen that a dot grown at a first growth point and a dot grown at a second growth point are combined together, and thus, the dots grow.

FIG. 8 shows a dither matrix in which threshold values are arranged so as to create the first, second, and third growth points shown in the image 701. Images 901 to 907 in FIG.

9 show a transition of a screen image that is output when the screen processor 303 performs screen processing using the dither matrix shown in FIG. 8, on an image that has a 10×10 size and in which the pixel values of all the pixels are increased from 40% to 70% of 255 in increments of 5%.

Reference numeral 901 indicates a screen image that is generated when the image with 40% pixel values is input to the screen processor 303. As shown in the screen image 901, it can be seen that, at the stage of 40% pixel values, a high screen-ruling screen image with 190 lines is formed using the dots generated at the first growth points and the second growth points. It can also be seen that, from the screen images 902 to 906, the dots grow at the third growth points, and the dots at the first growth points and the second growth points are gradually combined together. Then, the screen image 907 shows that a screen image with 134 lines is generated. In this way, the screen images 901 to 902 thus formed are 190 screen-ruling screen images (halftone dots) characterized by a first screen angle. Also, from the screen images 902 to 906, dots that are centered around each third growth point grow, and are combined with each other. In this regard, the threshold values are arranged such that these screen images will be characterized by a screen angle that is different from the first screen angle. Therefore, halftones that are characterized by a second screen angle that is different from the first screen angle are formed. Also, through this growth process, the screen ruling of the screen images approaches 134 lines. Then, as the screen image 907, a 134-line screen image that is characterized by the second screen angle that is different from the first screen angle is formed.

The threshold values of the dither matrix used in the present embodiment are arranged such that each dot in the screen image 907 and the subsequent screen images grows so as to increase the size thereof to form a 134-line screen image. Alternatively, the threshold values may be arranged such that dots grow so as to be connected to each other to form a 134-line screen image.

Processing Procedure for Generating Print Image

Figure 10:
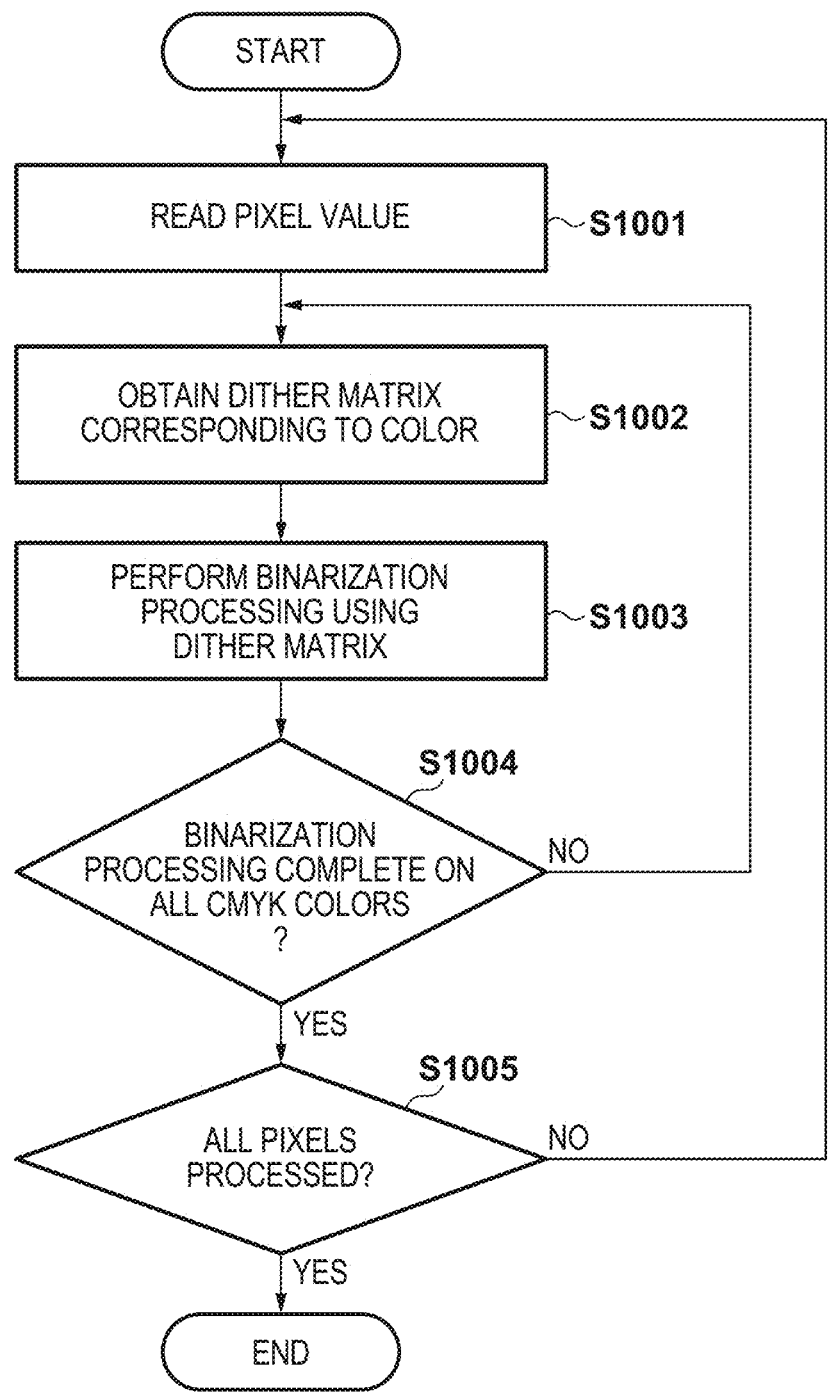
FIG. 10 is a flowchart of screen processing that is performed by the screen processing unit 303 according to one embodiment.

Next, the following describes processing procedures for screen processing that is executed by the screen processor 303 according to the present embodiment with reference to FIG. 10. Processing described below is realized by, for example, the CPU 102 reading out and loading a control program stored in the ROM 104 to the RAM 103, and executing the control program.

In step S1001, the screen processor 303 reads the pixel value of a pixel that is to be processed, from a CMYK image that has been received from the gamma correction processor 302 and is to be processed. Subsequently, in step S1002, the screen processor 303 selects one color from among CMYK colors of the pixel that is to be processed, and obtains a dither matrix for the selected color from the dither matrix storage 304.

Next, in step S1003, the screen processor 303 reads a threshold value that corresponds to the target pixel, from the dither matrix obtained in step S1002, compares the pixel value with the threshold value, and performs binarization processing. Subsequently, in step S1004, the screen processor 303 determines whether or not binarization processing has been performed on all of the CMYK colors of the target pixel. If binarization processing has been performed on all of the CMYK colors, processing proceeds to step S1005, and otherwise processing returns to step S1002.

In step S1005, the screen processor 303 determines whether or not screen processing has been performed on all of the pixels of the target image. If screen processing has been performed on all of the pixels of the target image, the screen processor 303 outputs a screen image thus generated, and ends screen processing. On the other hand, if screen processing has not been completed on all of the pixels, processing returns to step S1001.

As described above, in a dither matrix according to the present embodiment, threshold values are arranged so as to have a first growth point that indicates a center point of dot growth in a screen, and a second growth point that is located in the vicinity of the first growth point. Also, in the dither matrix, threshold values are arranged so as to have a third growth point at which dots generated at first and second growth points are combined and grow to be one dot. Furthermore, in the dither matrix, threshold values are arranged such that dots centered around a first growth point and a second growth point grow when the pixel value of an input pixel in a unit area is smaller than a predetermined threshold value, and dots centered around a third growth point grow when the pixel value of the input pixel is no less than a predetermined threshold value.

Effects of First Embodiment

Figure 11:
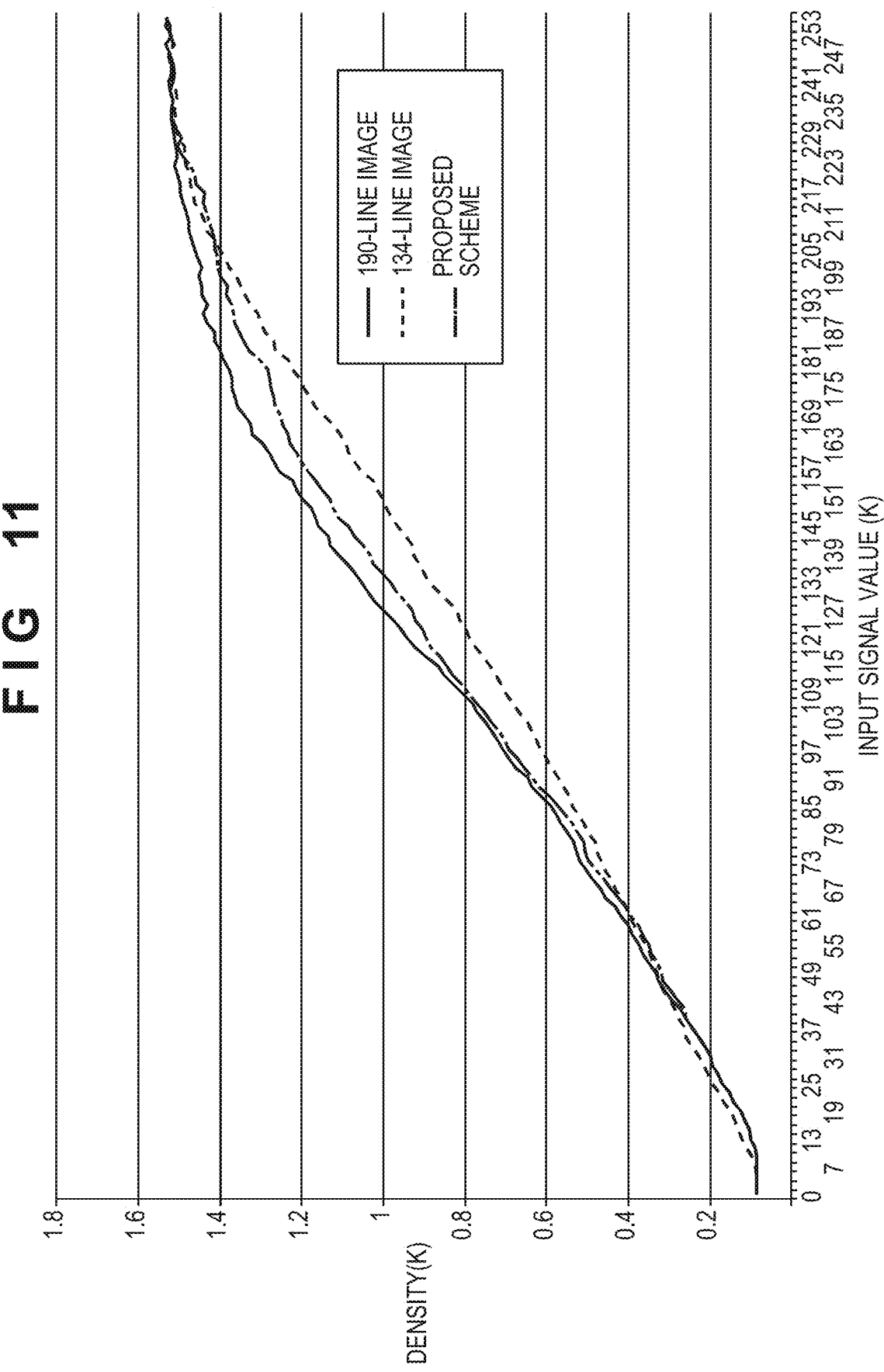
FIG. 11 is a diagram comparing the density tonality of a screen according to one embodiment with the density tonality of a high screen-ruling screen and the density tonality of a low screen-ruling screen.

Next, the following describes the effects of density tonality of a screen image obtained according to the present embodiment with reference to FIG. 11. FIG. 11 shows a graph comparing the density tonality of the high screen-ruling (190-line) screen image and the density tonality of the low screen-ruling (134-line) screen image shown in FIG. 6, to which the density tonality of a screen image obtained using dither matrices according to the present embodiment is added. The horizontal axis indicates an input signal value (K) and the vertical axis indicates a density value (K).

As shown in FIG. 11, the density tonality of the screen image according to the present embodiment is similar to the density tonality of the 190-line screen image until the input pixel value corresponding to the image 901 (40%) reaches 102 (40% of 255). Then, upon dot growth at the third growth points starting, changes in the density tonality become gentle and approaches the density tonality of the 134-line image. Then, in a high-density range, the density tonality is similar to that of the 134-line image.

In this way, dots centered around the first growth points and the second growth points grow until the density exceeds an intermediate-density range, so that a high screen-ruling screen image is formed. Upon the density exceeding the intermediate-density range, dots centered around the third growth points grow such that dots at the first growth points and dots at the second growth points are combined, so that a low screen-ruling screen image is formed. By performing two-step screen image formation, it is possible to prevent tonal loss from occurring in a high-density range of a high screen-ruling screen image while increasing the stability of dots, and consequently it is possible to perform reliable density control using an LUT.

Dots grow such that the dot pattern changes from a high screen-ruling screen to a low screen-ruling screen, and typically, moire in a mixed-color image, which is caused by a low screen-ruling screen image, is noticeable in a density range from a highlight to an intermediate density. A screen image generated using dither matrices employed in the present embodiment changes from a high screen-ruling screen to a low screen-ruling screen in the process of growth from an intermediate density to a high density, which does not match the aforementioned density range. Therefore, it is possible to perform reliable density adjustment while suppressing the influence of moire, and it is possible to reduce tonal loss.

Second Embodiment

The following describes a second embodiment of the present invention. In the above-described first embodiment, screen processing is performed through binarization processing using 1-bit dither matrices. However, when screen processing is performed on an image such as a photograph in which tonality is important, screen processing using multi-bit dither matrices is also performed. Thus, in the present embodiment, screen processing that uses multi-bit dither matrices is performed. Note that a difference between the above-described first embodiment and the present embodiment only lies in dither matrices, and other basic configurations are the same. Therefore, the following only describes the difference.

Screen Processing Using Multi-Value Dither Matrices

Figure 12:
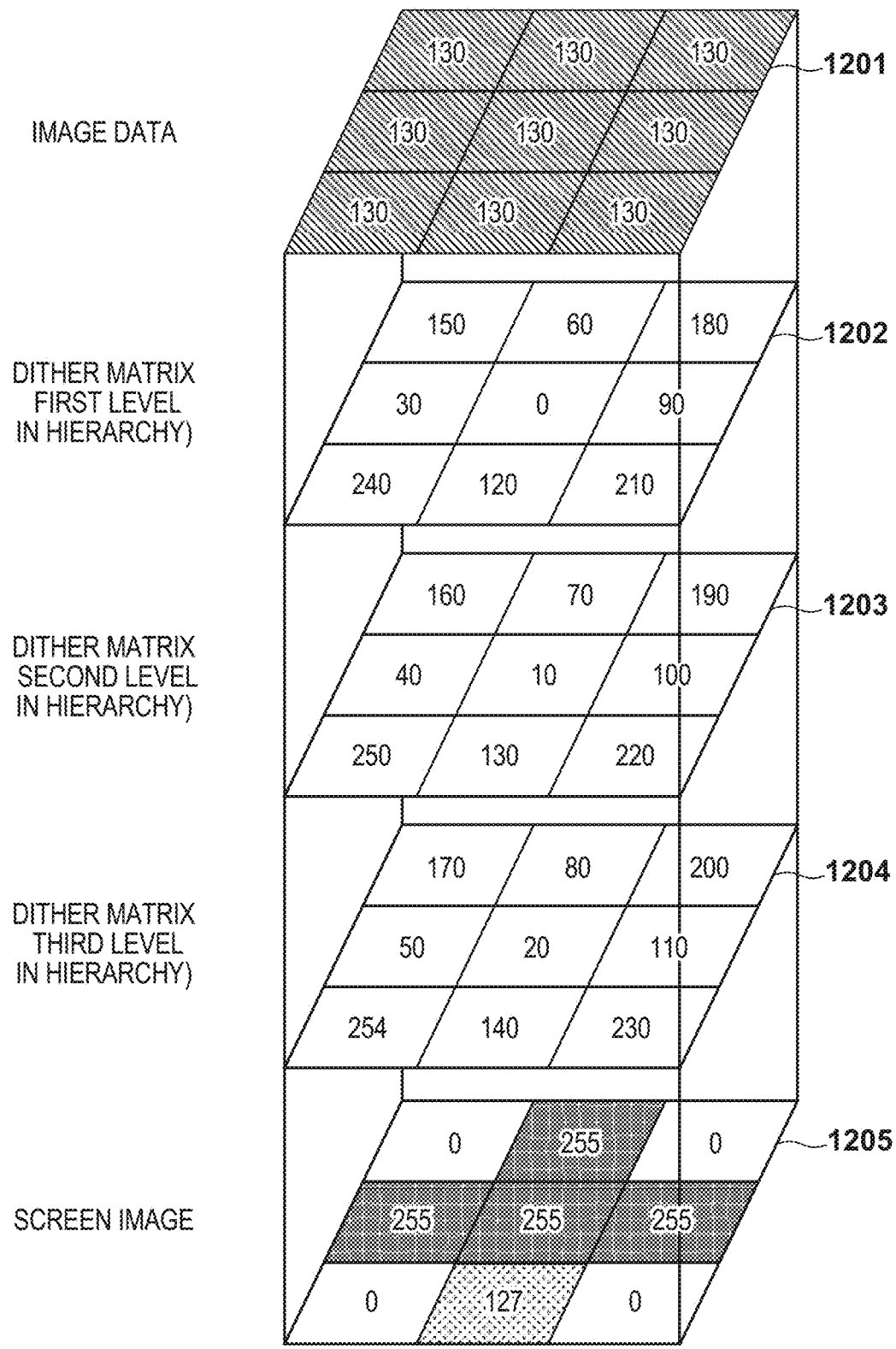
FIG. 12 is a diagram showing an example of an arrangement of threshold values when 2-bit dither matrices are used.

The following describes dither matrices employed in the present embodiment. In the present embodiment, processing that uses 2-bit dither matrices is performed. The following describes screen processing that is performed by the screen processor 303, using 2-bit dither matrices, with reference to FIG. 12. In FIG. 12, reference numeral 1201 indicates input image data, reference numerals 1202 to 1204 indicates 2-bit dither matrices used in screen processing, and reference numeral 1205 indicates screen image data obtained through screen processing.

In the present embodiment, screen processing that uses 2-bit dither matrices is performed. Therefore, each pixel of a screen image, which is the ultimate product, can take one of four values, namely, the minimum value (0), the maximum value (255), and two intermediate values. In the present embodiment, it is envisaged that each pixel of the screen image can take one of the pixel values 0, 127, 191, and 255.

In FIG. 4, according to the above-described first embodiment, there is only one dither matrix. However, the present embodiment employs 2-bit dither matrices, and thus, employs a three-level hierarchy of dither matrices 1202 to 1204. In the screen processing shown in FIG. 4, the pixel value of a target pixel is compared with the threshold value corresponding thereto in the dither matrix, and if the pixel value is greater than the threshold value, the pixel value corresponding thereto in the screen image is set to 255. In contrast, in the present embodiment, first, the pixel value of a target pixel is compared with the threshold value corresponding thereto in the first-level dither matrix 1202 in the hierarchy. At this time, if the pixel value is no greater than the threshold value, the pixel value corresponding thereto in the screen image 1205 is set to 0.

On the other hand, if the pixel value is greater than the threshold value of the first-level dither matrix 1202 in the hierarchy, the pixel value is subsequently compared with the threshold value corresponding thereto in the second-level dither matrix 1203 in the hierarchy. If the pixel value is no greater than the threshold value, the pixel value corresponding thereto in the screen image 1205 is set to 127. Similarly, if the pixel value is greater than the threshold value of the second-level dither matrix 1203 in the hierarchy, the pixel value is subsequently compared with the threshold value corresponding thereto in the third-level dither matrix 1204 in the hierarchy. If the pixel value is no greater than the threshold value, the pixel value corresponding thereto in the screen image 1205 is set to 191. If the pixel value of the target pixel is greater than the threshold value in the third level in the hierarchy, the pixel value corresponding thereto in the screen image 1205 is set to 255.

In the example shown in FIG. 12, processing using the dither matrices 1202 to 1204 is performed on the image data 1201 in which each pixel has a pixel value "130". If the threshold value corresponding to the target pixel in the first-level dither matrix 1202 in the hierarchy is no less than 130, the pixel value corresponding thereto in the screen image 1205 is set to 0. If all of the threshold values corresponding to the target pixel in the first- to third-level dither matrices 1202 to 1204 in the hierarchy are less than 130, the pixel value corresponding thereto in the screen image 1205 is set to 255. If a pixel has a pixel value that is greater than the threshold value corresponding thereto in the first-level dither matrix 1202 in the hierarchy, but is smaller than the threshold value corresponding thereto in the second-level dither matrix 1203 in the hierarchy, the pixel value corresponding thereto in the screen image 1205 is set to 127.

Arrangement of Threshold Values in Dither Matrices

Figure 13:
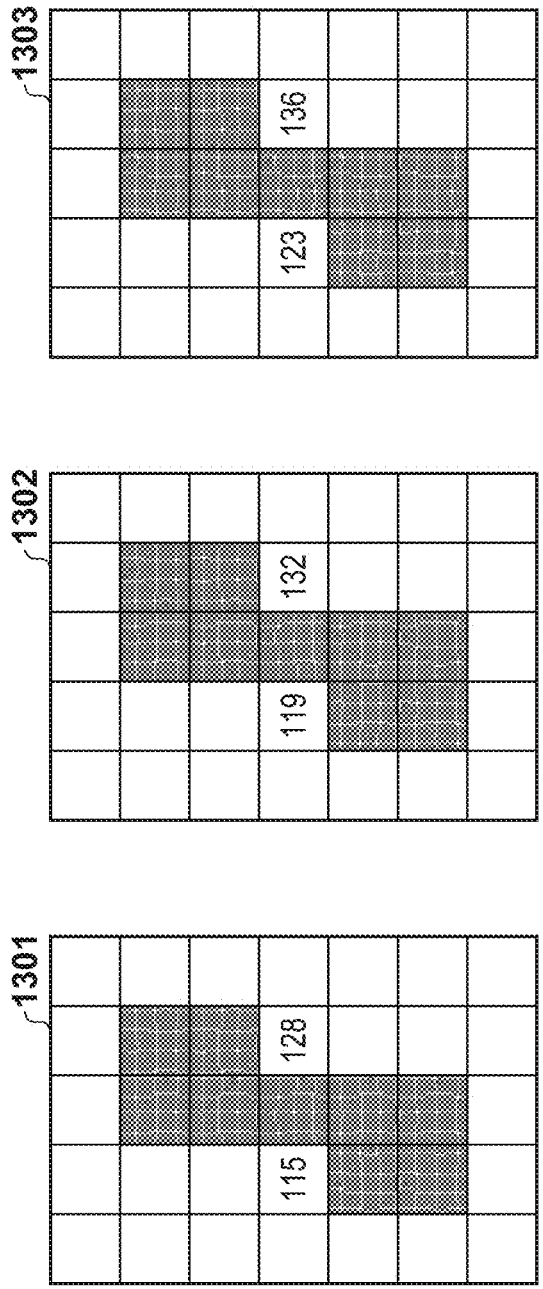
FIG. 13 is a diagram showing an example of dot growth when 2-bit dither matrices are used.
Figure 14:
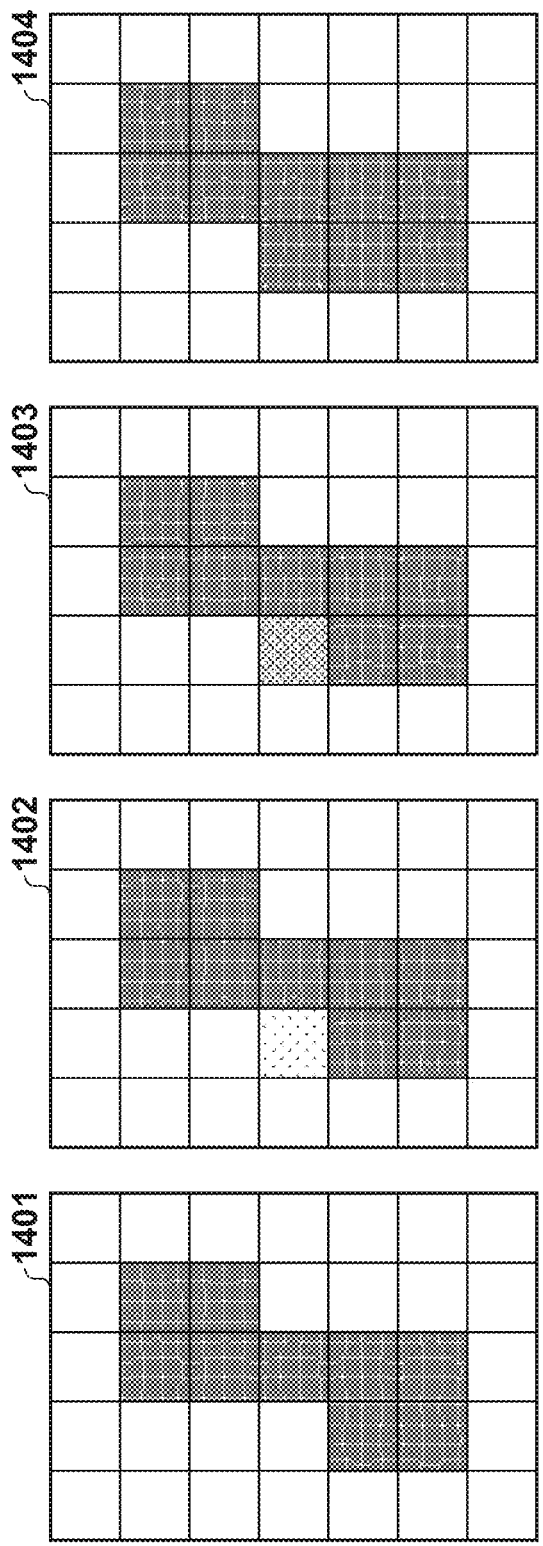
FIG. 14 is a diagram showing an arrangement of threshold values in a dither matrix according to one embodiment.

Next, the following describes the arrangement of the threshold values in the dither matrices according to the embodiment with reference to FIGS. 13 to 17. FIG. 13 shows some of the threshold values arranged for screen processing that is performed using 2-bit dither matrices. FIG. 14 shows a transition of dot growth when the dither matrices shown in FIG. 13 are used.

Dither matrices 1301 to 1303 each show dots that are combined due to dot growth started at a third growth point, and the threshold values of pixels that are expected to grow next. The black pixels (the shaded pixels) each express a pixel that has a threshold value compared to which the pixel value of the input pixel is already greater when dot growth starts at a third growth point, i.e., a pixel that has a threshold value that is smaller than the minimum threshold value shown in FIG. 12. The white pixels each express a pixel that has a threshold value that is greater than the maximum threshold value shown in FIG. 12. When 2-bit dither matrices are employed, three threshold values are set for each pixel.

Reference numeral 1301 indicates a first-level dither matrix in the hierarchy, reference numeral 1302 indicates a second-level dither matrix in the hierarchy, and reference numeral 1303 indicates a third-level dither matrix in the hierarchy. If a pixel value that is greater than the threshold value in the third-level dither matrix 1303 is input, a pixel value "255" is output through screen processing. If a pixel value that is greater than the threshold value in the first-level dither matrix 1301 or a pixel value that is greater than the threshold value in the second-level dither matrix 1302 is input, a predetermined intermediate value is output. In the present embodiment, if a pixel value that is greater than the threshold value in the first-level dither matrix 1301 is input, a pixel value "127" is output, and if a pixel value that is greater than the threshold value in the second-level dither matrix 1302 is input, a pixel value "191" is output.

FIG. 14 shows a transition of dots when images that respectively have pixel values "116", "120", and "124" are input to the dither matrices shown in FIG. 13. Reference numeral 1401 indicates an image formed when the input pixel value is smaller than 116, and reference numerals 1402 to 1404 indicate images formed when the input pixel values are "116", "120", and "124", respectively. As shown in FIG. 14, if threshold values are arranged as shown in FIG. 12, a dot grows in one pixel according to the pixel values of the input pixels. The threshold values are also arranged such that upon the pixel value of one pixel exceeding the maximum threshold value corresponding thereto, a dot in the next pixel starts growing. However, if dots grow through such a procedure, there will be a bias in the size of dots on the upper side and on the lower side. Therefore, in the present embodiment, threshold values are arranged such that when dots centered around a growth point grow, dots in two pixels that are opposite to each other with respect to the growth point alternatingly grow.

Figure 15:
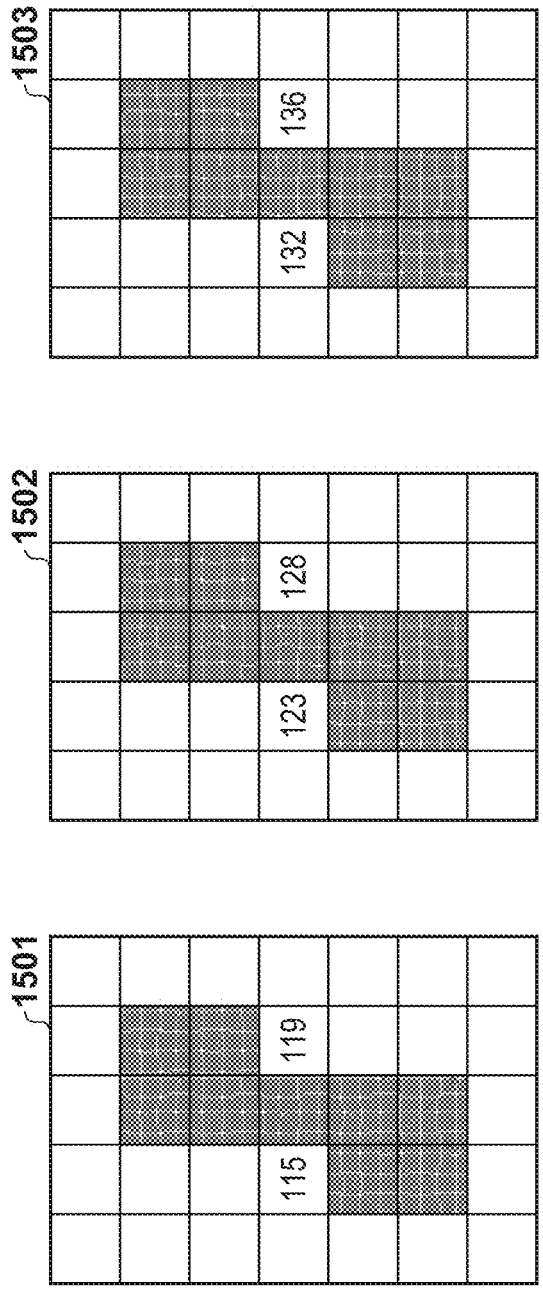
FIG. 15 is a diagram showing dot growth when a dither matrix according to one embodiment is used.
Figure 16:
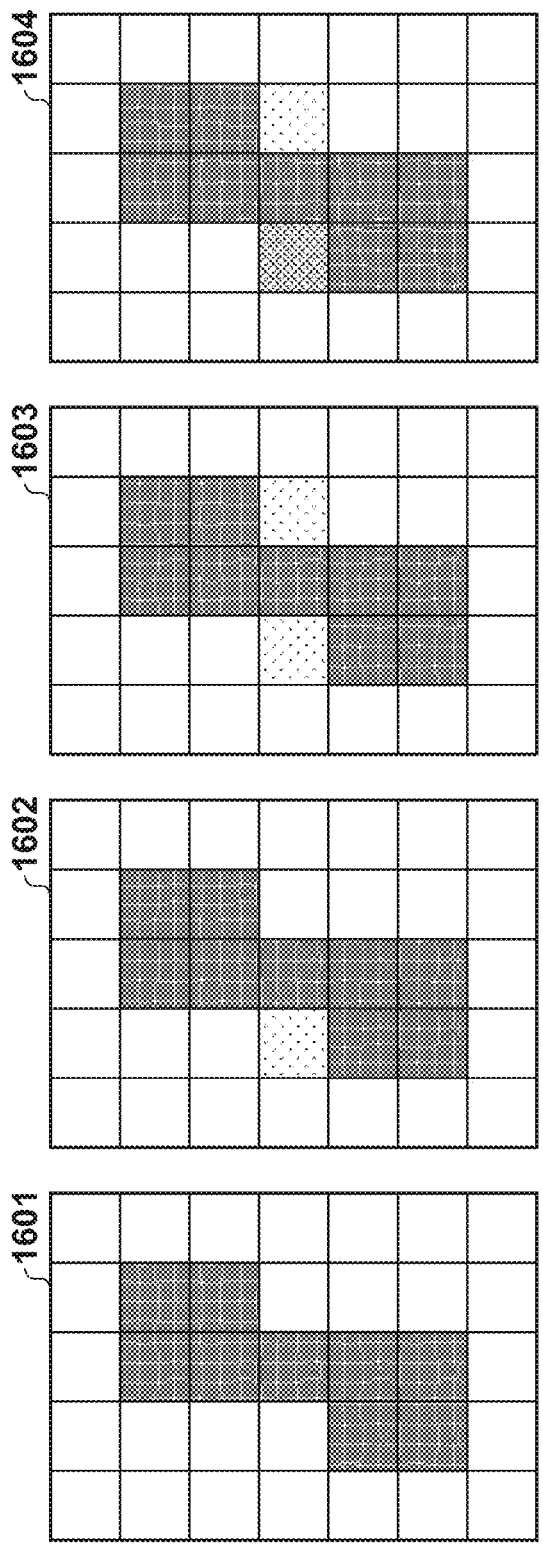
FIG. 16 is a diagram comparing dot growth in a case when a typical 2-bit dither matrix is used, with dot growth in a case when a dither matrix according to the present invention is used.

The following describes threshold values in the dither matrices employed in the present embodiment with reference to FIG. 15. Reference numeral 1501 indicates a first-level dither matrix in a hierarchy, reference numeral 1502 indicates a second-level dither matrix in the hierarchy, and reference numeral 1503 indicates a third-level dither matrix in the hierarchy. In FIG. 13, threshold values are arranged so as to be continuous with one pixel, whereas, in the present embodiment, threshold values are arranged in a dither matrix at each level in the hierarchy such that two pixels alternatingly grow. FIG. 16 shows a transition of dots when images that respectively have pixel values "116", "120", and "124" are input to the dither matrices shown in FIG. 15. As shown in images 1601 to 1604, it can be seen that dots in pixels alternatingly grow also when images are actually input.

Images 1701 to 1704 in FIG. 17 show a transition of dot growth when the dither matrices shown in FIG. 12 are employed, and images 1705 to 1708 show a transition of dot growth when the dither matrices shown in FIG. 14 are employed. These two transitions of dot growth also show that the dither matrices employed in the present embodiment can reduce a bias in the size of dots. In this way, by employing dither matrices in which threshold values are arranged so that two pixels alternatingly grow, it is possible to combine two dots without producing a bias in the size of dots.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
(A) a storage device that stores dither matrices that are used in screen processing that is executed to convert a multi-tone image to a binary image or a multi-value image that has a fewer number of tones than the multi-tone image; and
(B) a controlling portion having a hardware circuit, the controlling portion being configured:
(a) to obtain a dither matrix corresponding to an input multi-tone image, from among the dither matrices stored in the storage device; and
(b) to execute screen processing using the obtained dither matrix,
wherein each of the dither matrices has a first reference point at which a first dot is to be formed, a second reference point that is located in the vicinity of the first reference point and at which a second dot is to be formed, and a third reference point that is located between the first reference point and the second reference point, and the threshold values in each of the dither matrices are arranged such that,
(i) until a density value of a multi-tone image in a unit area gets to a first density value, dots are formed at and around the first reference point and at and around the second reference point, and, thus, halftone dots are formed at a first screen angle and at a first screen ruling, and
(ii) in a case when a density value of a multi-tone image in a unit area is not less than a second density value that is greater than the first density value, a third dot that is a combination of the first dot and the second dot is formed, and dots are also formed around the third dot so that the third dot is further combined with the dots, and, thus, halftone dots are formed at a second screen angle different from the first screen angle and at a second screen ruling lower than the first screen ruling.

2. The image forming apparatus according to claim 1, wherein the second reference point is a reference point that is different from the first reference point, and is one of a plurality of reference points that is nearest to the first reference point.

3. The image forming apparatus according to claim 1, wherein the third reference point is located at a midpoint between the first reference point and the second reference point.

4. The image forming apparatus according to claim 1, wherein threshold values around the third reference point are arranged such that, in a case when a value of a multi-tone image in a unit area is not less than the second value, a third dot that is centered around the third reference point and a dot that is located near the third dot are combined together, and, thus, halftone dots are formed at the second screen angle that is different from the first screen angle.

5. A method of controlling an image forming apparatus that includes a storage device that stores dither matrices that are used in screen processing that is executed to convert a multi-tone image to a binary image or a multi-value image that has a fewer number of tones than the multi-tone image, the method comprising:

obtaining a dither matrix corresponding to an input multi-tone image, from among the dither matrices stored in the storage device; and executing screen processing, using the dither matrix thus obtained, wherein each of the dither matrices has a first reference point at which a first dot is to be formed, a second reference point that is located in the vicinity of the first reference point and at which a second dot is to be formed, and a third reference point that is located between the first reference point and the second reference point, and the threshold values in each of the dither matrices are arranged such that, (i) until a density value of a multi-tone image in a unit area gets to a first density value, dots are formed at and around the first reference point and at and around the second reference point, and, thus, halftone dots are formed at a first screen angle and at a first screen ruling, and (ii) in a case when a density value of a multi-tone image in a unit area is not less than a second density value that is greater than the first density value, a third dot that is a combination of the first dot and the second dot is formed, and dots are also formed around the third dot so that the third dot is further combined with the dots, and, thus, halftone dots are formed at a second screen angle different from the first screen angle and at a second screen ruling lower than the first screen ruling.

6. A dither matrix that is used in screen processing that is executed to convert a multi-tone image to a binary image or a multi-value image that has a fewer number of tones than the multi-tone image, the dither matrix comprising:

a first growth point that indicates a center point around which a dot in a screen is to grow, a second growth point that is located in the vicinity of the first growth point, and a third growth point at which dots grown at the first and second growth points are combined and grow to be one dot;

(a) a first reference point at which a first dot is to be formed, (b) a second reference point that is located in the vicinity of the first reference point and at which a second dot is to be formed, and (c) a third reference point that is located between the first reference point and the second reference point, wherein threshold values in the dither matrix are arranged such that (i) until a density value of a multi-tone image in a unit area gets to a first density value, dots are formed at and around the first reference point and at and around the second reference point, and, thus, halftone dots are formed at a first screen angle and at a first screen ruling, and (ii) in a case when a density value of a multi-tone image in a unit area is not less than a second density value that is greater than the first density value, a third dot that is a combination of the first dot and the second dot is formed, and dots are also formed around the third dot so that the third dot is further combined with the dots, and, thus, halftone dots are formed at a second screen angle different from the first screen angle and at a second screen ruling lower than the first screen ruling.

7. The dither matrix according to claim 6, wherein the second reference point is a reference point that is different from the first reference point, and is one of a plurality of reference points that is nearest to the first reference point.

8. The dither matrix according to claim 6, wherein the third reference point is located at a midpoint between the first reference point and the second reference point.

9. The dither matrix according to claim 6, wherein threshold values around the third reference point are arranged such that, in a case when a value of a multi-tone image in a unit area is not less than the second value, a third dot that is centered around the third reference point and a dot that is located near the third dot are combined together, and, thus, halftone dots are formed at the second screen angle that is different from the first screen angle.

\* \* \* \* \*